United States Patent
Sreenivas et al.

(10) Patent No.: US 8,692,535 B1
(45) Date of Patent: Apr. 8, 2014

(54) CONTROL PARAMETER ADJUSTMENT IN A DISCONTINUOUS POWER MODE

(75) Inventors: Venkat Sreenivas, Winchester, MA (US); Robert T. Carroll, Andover, MA (US)

(73) Assignee: International Rectifier Corporation, El Segundo, CA (US)

( * ) Notice: Subject to any disclaimer, the term of this patent is extended or adjusted under 35 U.S.C. 154(b) by 497 days.

(21) Appl. No.: 12/964,601

(22) Filed: Dec. 9, 2010

(51) Int. Cl.
*G05F 1/00* (2006.01)

(52) U.S. Cl.
USPC ........................................................ 323/285

(58) Field of Classification Search
USPC .................................................. 323/282–285
See application file for complete search history.

(56) References Cited

U.S. PATENT DOCUMENTS

| | | | |
|---|---|---|---|
| 6,791,306 B2* | 9/2004 | Walters et al. ................. | 323/285 |
| 2007/0035284 A1* | 2/2007 | Schoofs et al. ............... | 323/283 |
| 2007/0279024 A1* | 12/2007 | Falvey et al. .................. | 323/280 |
| 2009/0046485 A1* | 2/2009 | Wei et al. ........................ | 363/26 |
| 2010/0013307 A1* | 1/2010 | Heineman et al. .............. | 307/33 |

* cited by examiner

*Primary Examiner* — Jue Zhang
(74) *Attorney, Agent, or Firm* — Chapin IP Law, LLC

(57) ABSTRACT

A controller operates a power supply in a discontinuous mode. While in the discontinuous mode, a monitor resource in the controller monitors current supplied by an inductor resource in the power supply to produce an output voltage to power a load. An adjustment value generator produces an adjustment value based on a magnitude of the current supplied to the load by the inductor resource. According to one configuration, the adjustment value equals the average inductor current multiplied by the load-line resistance value of the power supply. The controller produces an adjusted trigger threshold value by reducing a trigger threshold value by the adjustment value generated by the adjustment value generator. The adjusted trigger threshold value specifies a reduced threshold voltage at which the power supply controller turns ON a control switch in the power supply to increase an amount of current supplied by the inductor resource to the load.

19 Claims, 8 Drawing Sheets

CONTROL PARAMETER ADJUSTMENT IN A DISCONTINUOUS POWER MODE

BACKGROUND

Conventional switching power supply systems sometimes operate in a so-called discontinuous operational mode. Operation of a conventional switching power supply in the discontinuous mode can include three-state switching operation period cycle.

For example, during a first switch state in the discontinuous mode switching cycle, the conventional power supply controller activates only a respective control switch to couple an inductor to a positive voltage source to increase an amount of current through the inductor to a load.

During a second switch state in the discontinuous mode switching cycle, the conventional power supply controller deactivates the control switch and activates a synchronous switch to couple the inductor to ground. In general, activating the synchronous switch decreases the current supplied through the inductor to the load.

During a third switch state in the discontinuous mode switching cycle, the conventional power supply controller deactivates both the control switch and the synchronous switch. While in the third switch state, generally no current flows through the inductor to the load. During the third switch state, an output capacitance of the power supply outputs current to power the load. Eventually, the voltage on the output capacitors falls below a threshold value at which time the conventional controller initiates activation of a new discontinuous mode switching cycle and activation of the control switch again (e.g., first switch state).

Thus, in general, operating a conventional power supply in the discontinuous mode reduces the switching frequency of the power supply and reduces an overall amount of current supplied through the one or more inductors to the load.

Operating the power supply in a continuous mode includes implementing only the first switch state and the second switch state.

BRIEF DESCRIPTION

Conventional applications such as those as discussed above can suffer from a number of deficiencies. For example, conventional power supply systems as discussed above sometimes use an analog current sense, along with an external resistor network, to produce a load line voltage correction value during a continuous operational mode. The continuous operational mode includes switching between two states: i) a first state includes activation of the control switch while the synchronous switch is deactivated, and ii) a second state includes deactivation of the control switch while the synchronous switch is activated. In one conventional implementation of the continuous operational mode, the corresponding load-line voltage is used to adjust a reference voltage that is used to produce an output voltage.

Conventional load-line voltage correction is currently not implemented during a discontinuous operational mode because the switching frequency of the power supply is typically too low during the discontinuous operational mode. In the discontinuous operational mode, when the load is relatively light, the current through the inductor (to increase the magnitude of the output voltage) appears to be a spike of a short or insignificant duration compared to the bulk of time in which no current flows through the inductor to power the load. Producing a load-line voltage correction value based on the spike current through the inductor would result in a non-uniform load line voltage. Accordingly, conventional techniques do not attempt to apply load-line voltage correction during a discontinuous operational mode.

Embodiments herein deviate with respect to conventional applications. For example, embodiments herein are directed to unique ways of implementing load-line voltage adjustments while in a discontinuous operational mode. Embodiments herein further include a unique and cost effective implementation of load-line correction during a high efficiency, low switching frequency discontinuous mode of operation for a switching voltage regulator. Utilizing the load-line voltage correction during the discontinuous mode as discussed herein can reduce a number of output capacitors in a voltage regulator. In one embodiment, implementation of the load-line voltage adjustment techniques during the discontinuous operational mode causes the output voltage of the power supply to shift down from a setpoint or reference voltage by a voltage amount that is proportional to the current through the inductor.

More specifically, one embodiment herein includes operating a power supply in a discontinuous switching mode. For example, a power supply controller operates the power supply in a discontinuous operational mode. While in the discontinuous mode, a monitor resource in the power supply controller monitors current supplied by at least one energy storage resource such as an inductor resource in the power supply to produce an output voltage to power the load. A voltage adjustment value circuit produces an adjustment value based on a magnitude or average amount of the current supplied by the at least one inductor resource in the power supply to power the load. The controller utilizes the adjustment value to modify a trigger threshold value and produce an adjusted trigger threshold value. For instance, the trigger threshold value may specify an output voltage or reference voltage at which the power supply controller initiates starting a new discontinuous mode switching cycle. In one embodiment, the power supply controller initiates turning ON a control switch in the power supply to couple the at least one inductor resource to a voltage source and increase an amount of current supplied by the inductor resource to the load when the output voltage is equal to or falls below the adjusted threshold voltage value. Accordingly, embodiments herein include taking into providing load-line voltage compensation during a discontinuous operational mode of a power supply.

In further embodiments, the controller receives an analog value indicative of the magnitude of current through the at least one inductor resource. A circuit in the controller such as filter circuitry can be configured to convert the analog value (representing an amount of current supplied to load and output capacitors) into a digital value using an analog to digital converter. The filter circuitry can be configured as a low frequency digital filter tracking an amount of current through the inductor during the discontinuous mode. A voltage adjustment value generator of the controller receives the digital value from the filter circuitry as well as a load-line resistance value associated with the power supply. The load-line resistance value can be stored in a configuration register. In one embodiment, an arithmetic function in the controller multiplies the filtered digital value by the load-line resistance value to produce a voltage adjustment value. The voltage adjustment value is then used to modify a parameter such as a threshold specifying at what output voltage level to activate the control switch in the power supply. For example, in accordance with embodiments herein, the controller can reduce a trigger voltage value by a magnitude of the adjustment value. When the output voltage of the power supply falls below the adjusted trigger value, the controller initiates activation of the control switch again to increase current through the inductor and raise a magnitude of the output voltage. Thus, activation of the synchronous switch prevents the output voltage from falling below a minimum acceptable value.

These and other more specific embodiments are disclosed in more detail below.

The embodiments as described herein are advantageous over conventional techniques. For example, as discussed above, implementation of load-line voltage correction in the discontinuous mode enables a set of output capacitors to power a load during a discontinuous mode. Also, in comparison to conventional techniques, the controller and/or related circuitry as discussed herein can be smaller or require fewer capacitor components than conventional power supply control systems.

In accordance with further embodiments, another embodiment herein includes a method for implementing load-line correction via a power supply controller operating a power supply in a discontinuous operational mode. In accordance with such an embodiment, the power supply controller monitors current supplied by at least one inductor resource in the power supply to produce an output voltage to power a load; produces an adjustment value based on a magnitude of the current supplied by the at least one inductor resource in the power supply to power the load; and utilizes the adjustment value to modify a trigger threshold value and produce an adjusted trigger threshold value at which the power supply controller initiates reactivation of a control switch in the power supply.

It is to be understood that the systems, methods, apparatus, etc., as discussed herein can be embodied strictly as hardware, as a hybrid of software and hardware, or as software alone such as within a processor, or within an operating system or a within a software application. Example embodiments of the invention may be implemented within products and/or software applications such as those developed or manufactured by CHiL Semiconductor of Tewksbury, Mass., USA.

As discussed herein, techniques herein are well suited for use in applications such as switching power supplies, voltage regulators, low voltage processors, buck converters, boost regulators, buck-boost regulators, etc. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a unique and cost effective implementation of a discontinuous power supply mode in a switching power supply. For example, a controller can be configured to operate the power supply in a discontinuous mode. While in the discontinuous mode, a monitor resource in the controller monitors current supplied by one or more inductor resources in the power supply to produce an output voltage to power a load. An adjustment value generator produces an adjustment value based on a magnitude of the current supplied to the load by one or more inductor resources.

According to one configuration, the adjustment value equals the average inductor current (as supplied by the combination of one or more inductors) multiplied by the load-line resistance value of the power supply. The controller produces an adjusted trigger threshold value by reducing a trigger threshold value by the adjustment value generated by the adjustment value generator. The adjusted trigger threshold value specifies a parameter such as a reduced threshold voltage at which the power supply controller turns ON a control switch in the power supply to increase an amount of current supplied by the inductor resource to the load. Reactivation of the control switch in the power supply prevents the output voltage of the power supply from falling below an acceptable threshold voltage value.

The discontinuous power supply mode as discussed herein can provide high power conversion efficiency (low internal power loss) even at relatively light load conditions when a load consumes a small amount of current, while holding up an output voltage for a longer duration before reactivation, reducing an amount of required output capacitance required in a power supply.

Figure 1:
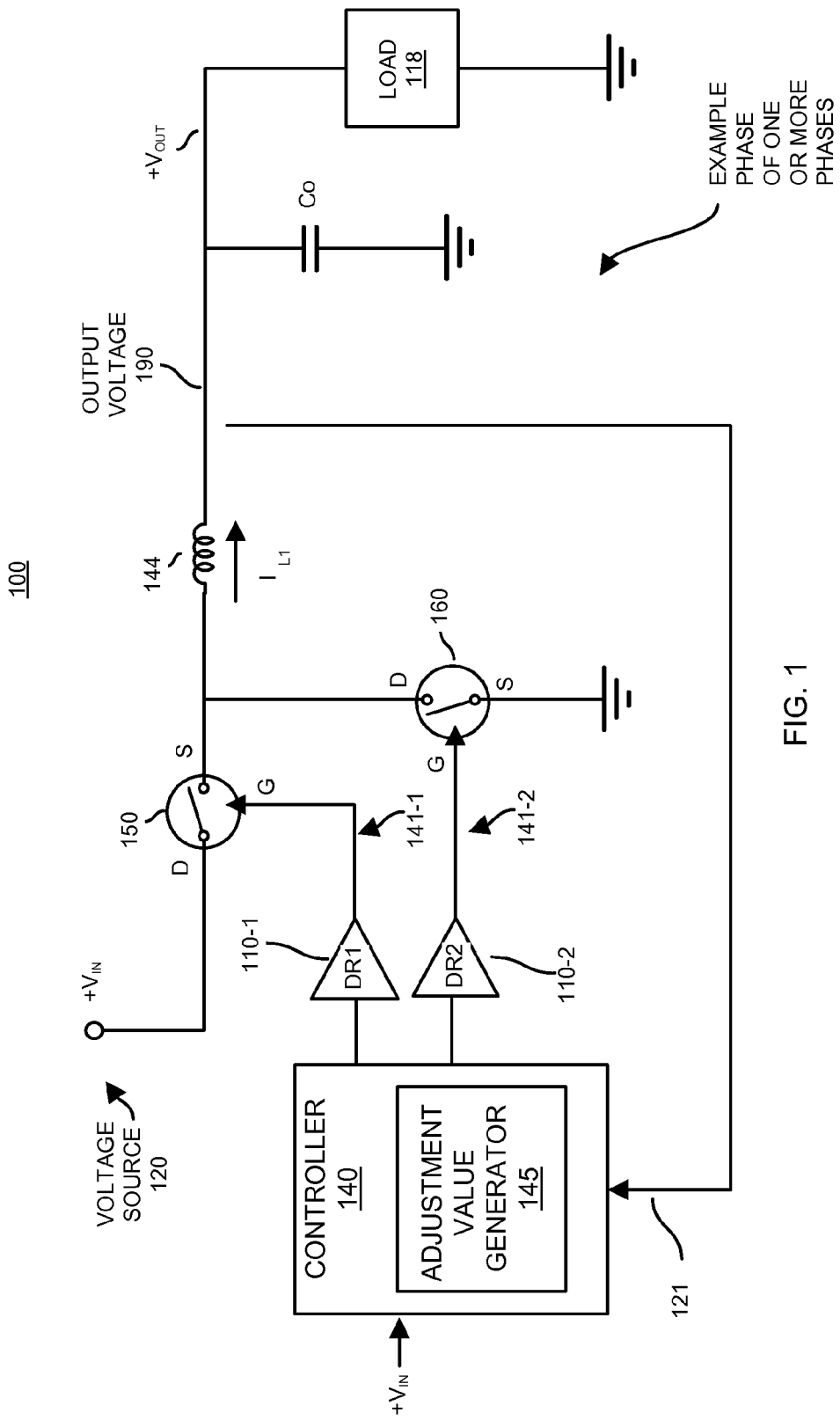
FIG. 1 is an example diagram of a power supply and parameter adjustment circuitry according to embodiments herein.

FIG. 1 is an example diagram of a power supply 100 according to embodiments herein. As shown, the power supply 100 includes controller 140. Controller 140 controls an operation of drivers 110 to produce an output voltage 190.

More specifically, according to one embodiment, controller 140 receives inputs 121 such as Vin, $I_{L1}$, Vout, etc.

Based on the received inputs 121 and configuration settings of controller 140, controller 140 outputs control signals to switch the control switch 150 (e.g., high side switch) and synchronous switch 160 (e.g., low side switch) ON and OFF. Switching operation of the control switch 150 and the synchronous switch 160 produces output voltage 190 to power load 118.

The controller 140 generates signals controlling the driver circuits 110-1 and 110-2. Based on control signals received from the controller 140, driver 110-1 controls a state of the control switch 150 and driver 110-2 controls a state of the synchronous switch 160 in power supply 100.

Note that driver circuits 110 (e.g., driver circuit 110-1 and driver circuit 110-2) can be located in the controller 140 or can reside at a remote location with respect to the controller 140.

When control switch 150 is turned ON (i.e., activated) via control signals generated by controller 140 (while the synchronous switch 160 is OFF), the current through inductor resource 144 increases based on a highly conductive path provided by control switch 150 between voltage source 120 and inductor resource 144.

When synchronous switch 160 is turned ON (i.e., activated) via control signals generated by controller 100 (while the control switch 150 is OFF), the current through inductor resource 144 decreases based on a highly conductive path provided by the synchronous switch 160 between the inductor resource 144 and ground as shown.

Based on switching of the control switch 150 and the synchronous switch 160 in a continuous or discontinuous mode, the controller 140 regulates the output voltage 190 within a desired range to power load 118.

In one embodiment, power supply 100 can include multiple phases. Each of the multiple phases can be similar to the example phase shown in FIG. 1. In such an embodiment, the controller 100 operates the phases to maintain the output voltage 190 within a desired range to power load 118. The phases can be operated out of phase with respect to each other.

Each phase can include a respective high side switch circuit and low side switch circuit as previously discussed. To deactivate a respective phase, the phase controller 140 can set both high side switch circuitry and low side switch circuitry of the respective phase to an OFF state. When off or deactivated, the respective phase does not contribute to producing current to power the load 118.

The controller 140 can select how many phases to activate depending on an amount of current consumed by the load 118. For example, when the load 118 consumes a relatively large amount of current, the controller 100 can activate multiple phases to power the load 118. When the load 118 consumes a relatively small amount of current, the controller 140 can activate a single phase to power the load 118.

During a discontinuous mode, the controller 140 can initiate activation of one or more phases to power the load 118.

Any of multiple different suitable types of methods such as estimations or physical measurements can be used to detect an amount of current consumed by the load 118.

Embodiments herein include operating one or more of the phases in a unique discontinuous mode as discussed herein to power load 118. For example, in accordance with a general embodiment herein, the controller 140 operates switches 150 and 160 (in each of one or more phases) to produce an output voltage 190 while in a continuous or discontinuous operational mode. The controller 140 can be configured to digitally monitor (via feedback 121) a parameter such as the total current to the load 118 (or current through the one or more inductors) to determine whether to switch from a continuous switching mode to discontinuous switching mode. In one embodiment, if the average current supplied to the load 118 falls below a threshold value, the controller 140 can initiate operation of the power supply 100 in a so-called discontinuous mode as discussed herein.

For example, while in the continuous mode, the controller 140 can monitor a power supply parameter such as the ripple current. Detecting when the ripple current falls below a threshold value such as zero indicates a relatively light load condition (e.g., the load 118 consumes relatively low current).

To avoid false triggering and switching over from the continuous mode to a discontinuous switching mode, the controller 140 can require several cycles of negative inductor current detection and/or a current below a threshold value to trigger a change in mode from the continuous operational mode to a discontinuous operational mode.

If it has been determined that the current through the inductor resource 144 (or a combination of inductor resources in each of multiple phases) is approximately zero or below a threshold value because the load 118 is relatively light, the controller 140 switches to the discontinuous mode. The threshold value can be programmed via a user and stored in a repository such as non-volatile memory of the controller 140.

After switching to the discontinuous mode, based on detecting the light load condition, the controller 140 monitors the output voltage 190. Upon detecting that a magnitude of the output voltage 190 drops below a threshold value such as a received digital value inputted to the controller, the controller 140 activates (e.g., turns ON) the control switch 150. As mentioned above, activation of the control switch 150 increases an amount of current through the inductor resource 144 to the load 118.

By way of a non-limiting example, in one embodiment, the controller 140 activates the control switch 150 for a preprogrammed duration of time upon detecting that the output voltage falls below an adjusted threshold value as discussed herein. The preprogrammed duration of time (when the controller switch is activated) can be user selectable and stored in the controller 140. As previously discussed, activation of the control switch 150 increases a magnitude of the output voltage 190.

Subsequent to activating the control switch 150 for a preprogrammed duration of time, the controller 140 can deactivate the control switch 150 and activate the synchronous switch 160. In one embodiment, the controller 160 initiates activation of the low side switch for an estimated amount of time to discharge the inductor resource to approximately zero current.

In accordance with further embodiments, the calculated period or estimated time duration for activating the low side switch (e.g., synchronous switch) is calculated based at least in part on parameters such as the input voltage, the output voltage, the pulse width of the control FET pulse, a driver pulse truncation time, etc.

After activating the low side switch (e.g., synchronous switch 160) for the estimated time duration in a given switching cycle, the controller 140 deactivates the synchronous switch 160.

While in a tri-state mode (e.g., when both control switch 150 and synchronous switch 160 are deactivated) of a respective discontinuous mode switching cycle, the controller 140 waits for the output voltage 190 to drop below a value before initiating activation of the high side switch 150 again. During the discontinuous mode when both switches are OFF, the adjustment value generator 145 of controller generates an adjustment value as discussed herein.

Figure 2:
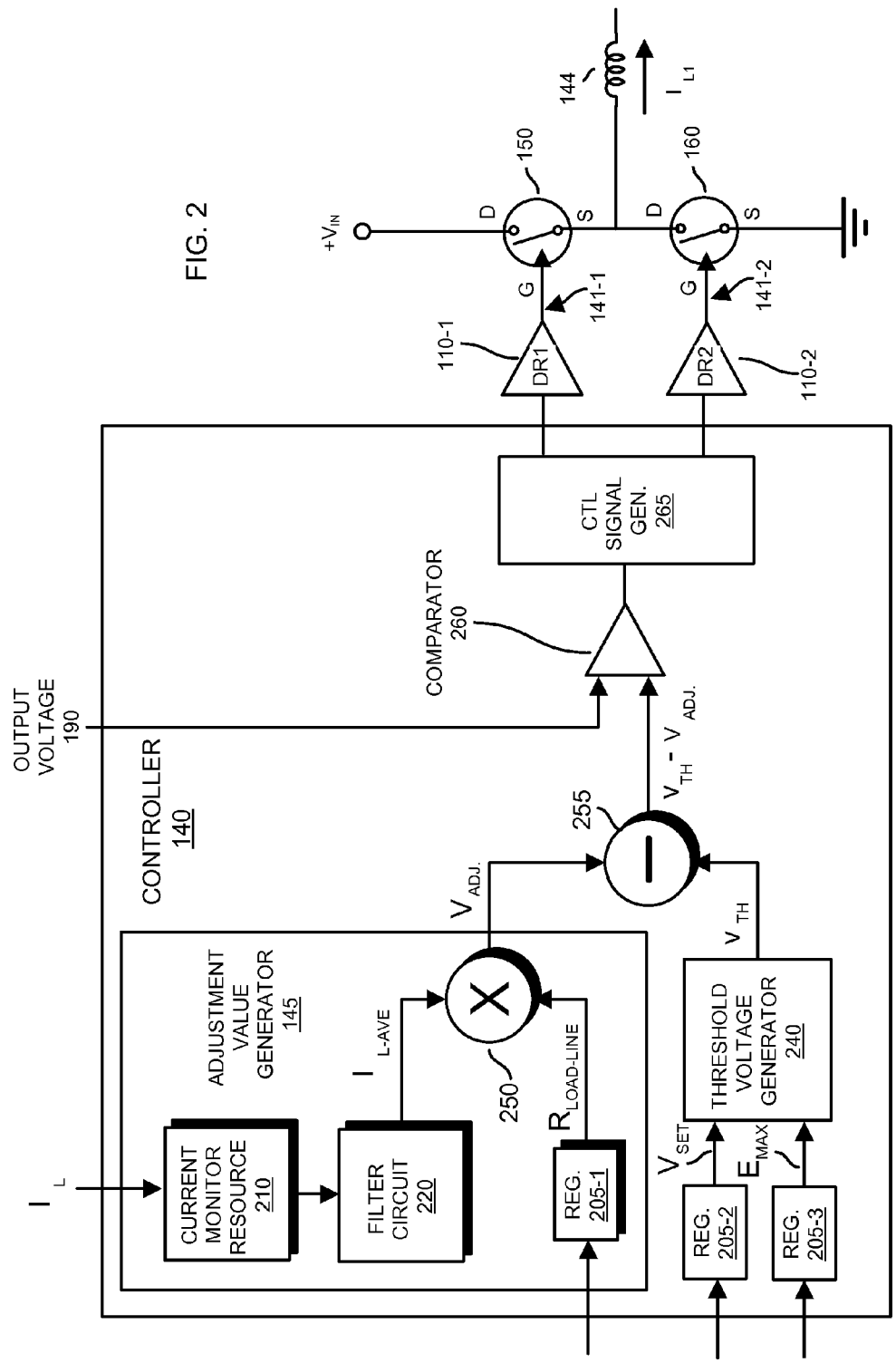
FIG. 2 is an example diagram of a power supply operating in a discontinuous operational mode according to embodiments herein.

FIG. 2 is an example diagram illustrating an example implementation of a controller 140 according to embodiments herein. As shown, controller 140 includes adjustment value generator 145. Adjustment value generator 140 includes a current monitor resource 210, a filter circuit 220, multiplier 250, and register 205-1. Controller 140 further includes register 205-2, register 205-3, threshold value generator 240, arithmetic function 255, comparator 260, and control signal generator 265.

Embodiments herein deviate with respect to conventional applications. For example, embodiments herein are directed to unique ways of implementing load-line voltage adjustments while in a discontinuous operational mode. Utilizing the load-line voltage correction (based on $V_{ADJ}$) as discussed herein can reduce a number of output capacitors in a voltage regulator. As discussed below, implementation of the load-line voltage adjustment techniques during the discontinuous operational mode causes the output voltage 190 of the power supply 100 to shift down from the reference voltage by a voltage amount that is proportional to the current through the one or more inductor resource of the power supply 100.

More specifically, one embodiment herein includes operating power supply 100 in a discontinuous switching mode as discussed herein. While in the discontinuous mode, current monitor resource 210 in the controller 140 monitors current supplied by one or more inductor resources in the power supply 100 that are used to produce an output voltage 190 to power the load 118.

Adjustment value generator 145 (e.g., a voltage adjustment value circuit) produces an adjustment value, $V_{ADJ}$, based on a magnitude or average amount of the current supplied by the one or more inductor resources in the power supply 100 to power the load 118.

In one embodiment, the controller 140 utilizes the adjustment value, $V_{ADJ}$, to modify a trigger threshold value and produce an adjusted trigger threshold value, namely, $V_{TH}-V_{ADJ}$.

For example, the trigger threshold value specifies a magnitude of an output voltage 190 at which the power supply controller 140 is to initiate starting a new discontinuous mode switching cycle. In one embodiment, to increase a magnitude of the output voltage 190, the power supply controller 140 initiates turning ON the control switch 150 in the power supply 100 to couple the inductor resource 144 to a voltage source 120 and increase an amount of current such as $I_{L1}$ supplied by the inductor resource(s) 144 to the load 118.

In further embodiments, the current monitor resource 210 of controller 140 receives an analog value indicative of the magnitude of current through the inductor resource 144. In one embodiment, an analog to digital circuit in current monitor resource 210 converts the received analog value of $I_L$ into a digital value using an analog to digital converter.

Filter circuit 220 receives the sampled digital values produced by the current monitor resource 210. The digital values produced by the current monitor resource 210 represent the magnitude of current supplied through inductor resource 144 to increase a magnitude of the output voltage 190.

The filter circuit 220 can be configured as a low frequency (e.g., 0 to 500 hertz) digital filter tracking an amount of current through the inductor during the discontinuous mode. In one embodiment, the filter circuit 220 is a low pass filter having a frequency cutoff on the order of several hertz.

Figure 3:
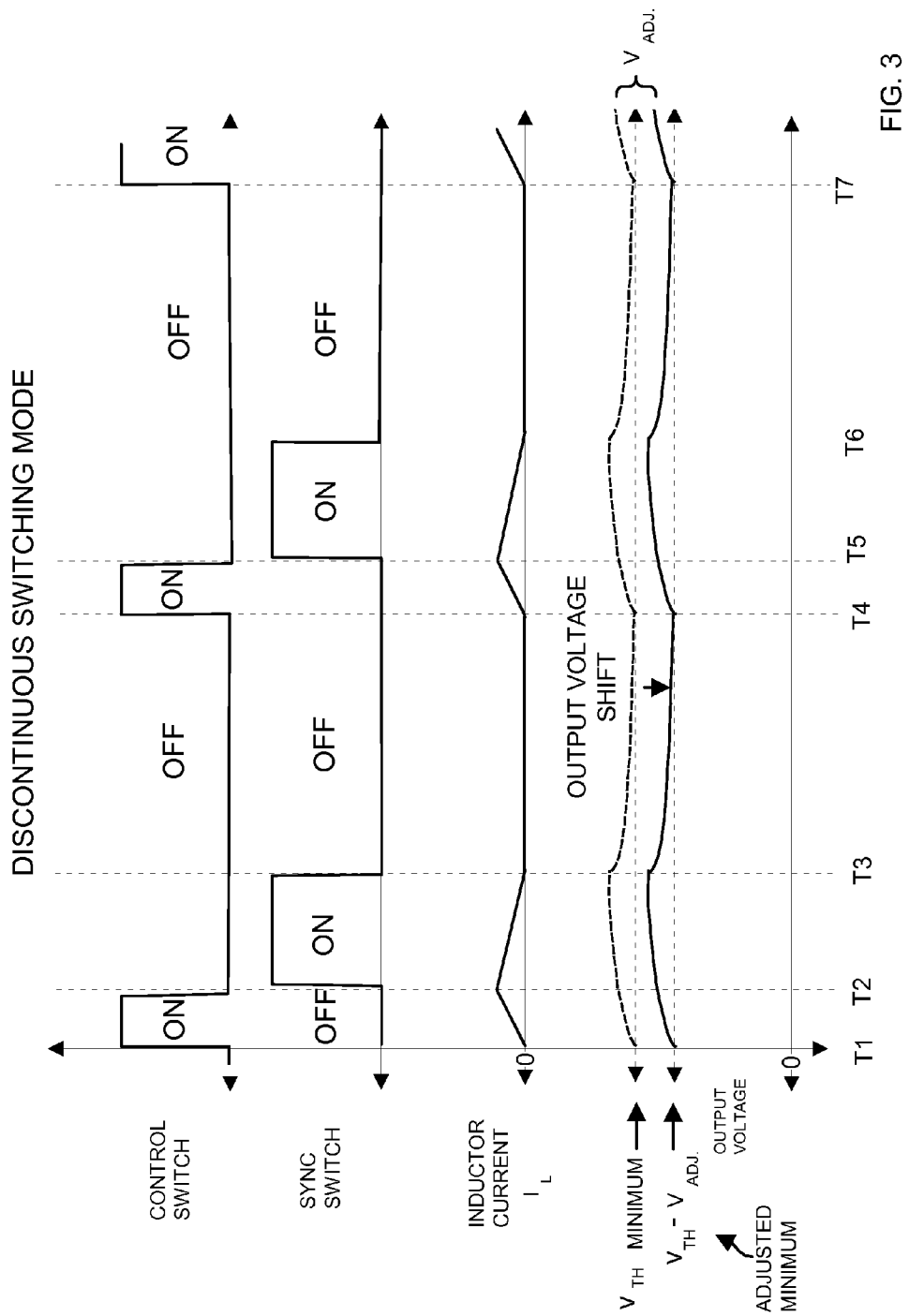
FIG. 3 is a timing diagram illustrating example voltage waveforms associated with operation of a power supply in a discontinuous switching mode according to embodiments herein.

While in the discontinuous mode, the control switch 150 and synchronous switch 160 may be operated at a frequency of around 100 hertz to over several thousand hertz. In one embodiment, based on settings of filter circuit 220, the filter circuit 220 keeps track of an average amount of current through the inductor over multiple discontinuous mode switching cycles as shown in FIG. 3.

A multiplier 250 in the adjustment value generator 145 receives the digital values from the filter circuit 220 as well as a load-line resistance ($R_{LOAD-LINE}$) value associated with the power supply 100. The load-line resistance value (related to the output impedance of the power supply 100) can be stored in a configuration register 205-1 of controller 140.

Load-line voltage correction can be performed by controller 140 at both high currents when operating in the continuous mode as well as at low current outputs such as when the controller 140 operates in a discontinuous mode.

In one embodiment, the load-line resistance value ($R_{LOAD-LINE}$) indicates a degree to which the output voltage can vary from a chosen setpoint value. For example, if the amount of current supplied by the power supply is on the high end of allowable current, it is tolerated to allow the output voltage 190 to fall a voltage amount (equal to the average current through the inductor resource times load-line resistance value ($R_{LOAD-LINE}$)) below the setpoint value. Embodiments herein include applying a load-line correction voltage to the threshold voltage when operating in a relatively low current mode (e.g., discontinuous mode).

The load-line resistance value stored in register 205-1 can be set in a number a number of ways. For example, in one embodiment, the respective user loads the value into the register 205-1 via a communication link from a source external to the controller 140. In one embodiment, the power supply circuit board (on which power supply 100 resides) is populated with an appropriate value component such as a resistor to set the load-line resistance value. The controller reads the value and stores it is in register 205-1.

In one embodiment, the arithmetic function such as multiplier 250 in the controller 140 multiplies the filtered digital value received from filter circuit 220 by the load-line resistance value $R_{LOAD-LINE}$ stored in register 205-1 to produce voltage adjustment value, $V_{ADJ}$.

The voltage adjustment value, $V_{ADJ}$, is then used to modify a parameter such as a threshold value, $V_{TH}$, which is a basis for activating the control switch again. For example, in accordance with embodiments herein, the controller 140 can reduce a trigger voltage value, $V_{TH}$, by the adjustment value to reduce a voltage at which the controller 140 activates control switch 150. For example, when operating in the discontinuous mode, and when the output voltage 190 of the power supply 100 is substantially near or falls below the adjusted trigger value, the controller 140 initiates activation of (i.e., turns ON) the control switch 150 again to increase current through the inductor and raise a magnitude of the output voltage 190. Thus, activation of the control switch 150 prevents the output voltage 190 from falling below a minimum acceptable value such as $V_{TH}-V_{ADJ}$.

By way of a non-limiting example, the threshold value, $V_{TH}$, can be generated based on values stored in register 205-2 and register 205-3. The value, $V_{SET}$, in register 205-2 represents a magnitude output voltage setting for generating output voltage 190. The value, $E_{MAX}$, stored in register 205-3 represents a maximum error voltage setting inputted by a resource such as a user configuring power supply 100. Note that values stored in register 205-2 and register 205-3 can be received from one or more resources external to the controller 140.

In accordance with one embodiment, threshold voltage generator 240 generates $V_{TH}$ based at least in part on the $V_{SET}$ and $E_{MAX}$. In one embodiment, the threshold voltage generator 240 generates $V_{TH}=V_{SET}-E_{MAX}$.

As previously discussed, arithmetic function 255 produces $V_{TH}-V_{ADJ}$.

FIG. 3 is an example timing diagram illustrating operation of power supply 100 and controller 140 in a discontinuous mode according to embodiments herein.

As shown, the controller 140 controls the control and synchronous switches ON and OFF during the discontinuous operational mode to prevent or reduce an amount of negative current from flowing through the inductor resource 144.

In accordance with one example embodiment, the following calculations apply to a buck converter:

ON_t represents the on time of the control switch 150 (e.g., high side switch 150) and is programmable During ON_t (e.g., a time between T1 and T2, T4 and T5, etc.) in FIG. 3, the current in the inductor rises from 0 to (ON_t)*(Vin−Vout)/L.

During ON_t, L*di/dt=(Vin−Vout).

Via the current estimation and mode control algorithm, the controller 140 calculates the OFF_t (e.g., a time between T2 and T3, T5 and T6, etc.) to completely discharge all the current in the inductor resource to zero current. OFF_t represents the amount of time the controller 140 activates the synchronous switch 160.

During OFF_t (e.g., between time T2 and time T3) when the synchronous switch 160 is activated and the control switch 150 is deactivated, the current in the inductor 144 falls at the rate Vout/L.

Thus, OFF_t*Vout/L=(ON_t)*(Vin−Vout)/L; and the on time of the synchronous switch, calculated OFF_t=(ON_t)*(Vin−Vout)/Vout.

Estimating or calculating the time duration in which to activate the synchronous switch 160 can include adjusting the time duration in which to activate a driver 110-2 to activate the second switch 160 based at least in part on an amount of time required to deactivate the second switch 160 via the driver 110-2.

Additional examples of operating a power supply in a discontinuous operational mode are discussed in related U.S. patent application Ser. No. 12/828,857, as filed on Jul. 1, 2010, the entire teachings of which are incorporated herein by this reference.

Accordingly, the controller 140 can initiate activation of the high side switch 150 for a first time duration such as ON_t as specified by a value in a register. The controller 140 can be configured to calculate a second time duration such as OFF_t for turning ON the synchronous switch 160 based at least in part on the input voltage and output voltage. The control 140 then initiates activation of the synchronous switch 160 for the second time duration OFF_t. Activation of the synchronous switch 160 coupling the inductor 144 to a reference voltage (e.g., ground) to reduce an amount of current though the inductor.

Now referring more particularly to FIG. 3, when in the discontinuous mode, the controller 140 activates the control switch 150 between time T1 and time T2 (e.g., for a time duration of ON_t).

The controller 140 activates the synchronous switch 160 between time T2 and time T3 (e.g., for a time duration OFF_t).

The controller 140 maintains both the high side switch (i.e., control switch 150) and the low side switch (i.e., synchronous switch 160) OFF between times T3 and T4.

As shown, the output voltage 190 increases in magnitude between time T1 and T3 and reduces between time T3 and T4. The ripple voltage of the output voltage is a measure from the minimum voltage to the maximum voltage for a switching cycle.

During the discontinuous mode, the average inductor current is a measure of the current through the inductor resources of power supply 100 over multiple cycles such as current supplied between time T1 and T3, T4 and T6, etc.

While in a tri-state mode (when the control switch and the synchronous switch are both deactivated) such as between T3 and T4, between T6 and T7, etc. the inductor resource 144 no longer supplies power to the load 118. During a tri-state mode, the capacitor $C_O$ supplies the power to the load 118.

At time T4, the comparator 260 of controller 140 detects that the output voltage 190 drops below a minimum acceptable threshold value $V_{TH}-V_{ADJ}$. In response to detecting such a condition, the controller 140 initiates turning on the control switch 150 again between time T4 and time T5. The controller repeats the steps of: turning OFF the control switch after a predetermined time; activating the synchronous switch 150 for an estimated time based on parameter such as feedback information 121; and deactivates both the high side switch and the low side switch again until the output voltage 190 falls below the minimum threshold value $V_{TH}-V_{ADJ}$.

Accordingly, embodiments herein include monitoring a magnitude of the output voltage 190 and, in response to detecting that the magnitude of the output voltage 190 falls below or is substantially equal to or near the adjusted trigger threshold value $V_{TH}-V_{ADJ}$, initiating activation of the control switch 150 in the power supply 100 to increase an amount of current $I_L$ through the at least one inductor 144 and increase a magnitude of the output voltage 190.

By way of a non-limiting example, the voltage setting, $V_{SET}$, may be set to a magnitude of 1.0 volts DC. The error voltage, $E_{MAX}$, may be set to a value of 10 millivolts. In accordance with such settings, without any load-line voltage compensation, $V_{TH}$ can be calculated as 1.0 volts−10 millivolts=990 millivolts.

When considering load-line resistance, the $R_{LOAD\_LINE}$ may be a value such as 2 milliohm. The average current through inductor resource 144 may be 1 ampere. Under such conditions, during the discontinuous mode, $V_{ADJ}$=1 ampere×2 milliohm=2 millivolt. In such an embodiment, $V_{TH}-V_{ADJ}$ therefore equals 988 millivolts. Without adjusting the threshold value, the threshold value would be 990 millivolts as previously discussed.

Accordingly, embodiments herein include receiving a voltage setpoint value, $V_{SET}$, in which to regulate a magnitude of the output voltage 190 of the power supply 100; receiving a programmed maximum error voltage value $E_{MAX}$ indicative of an acceptable error with respect to the voltage setpoint value; and setting an adjusted trigger threshold value, in which the controller initiates activation of a control switch in the power supply during the discontinuous operational mode, to be equal to:

$V_{SET}$ (setpoint value)−$E_{MAX}$ (programmed error voltage value)−$V_{ADJ}$.

In one embodiment, the adjustment value generator 145 produces an adjustment value between 0.5 millivolts and 100 millivolts, although the adjustment value generator 145 can produce an adjustment value of any suitable magnitude depending on the application.

Thus, according to embodiments herein, rather than activating the control switch 150 when the output voltage 190 falls below 990 millivolts, the controller 140 initiates activation of the control switch 150 when the output voltage 190 falls below 988 millivolts. Thus, adjusting based on the $V_{ADJ}$ reduces the trigger voltage at which the control switch 150 is activated. This unique case of reducing the threshold value by $V_{ADJ}$ takes into account the load-line voltage correction in the discontinuous mode. As previously discussed, conventional methods do not implement Idd voltage correction while in the discontinuous operational mode.

As mentioned above, the values for $R_{LOAD\_LINE}$, $V_{SET}$, and $E_{MAX}$ may vary depending on the application. For example, $R_{LOAD\_LINE}$ is typically a value such as between 0.1 and 100 millohms; $V_{SET}$ may be a value between 0.1 and 10 volts;

$E_{MAX}$ may be a value between 0 and 1000 millivolts, although any of the values can be any suitable value for a respective application.

Figure 4:
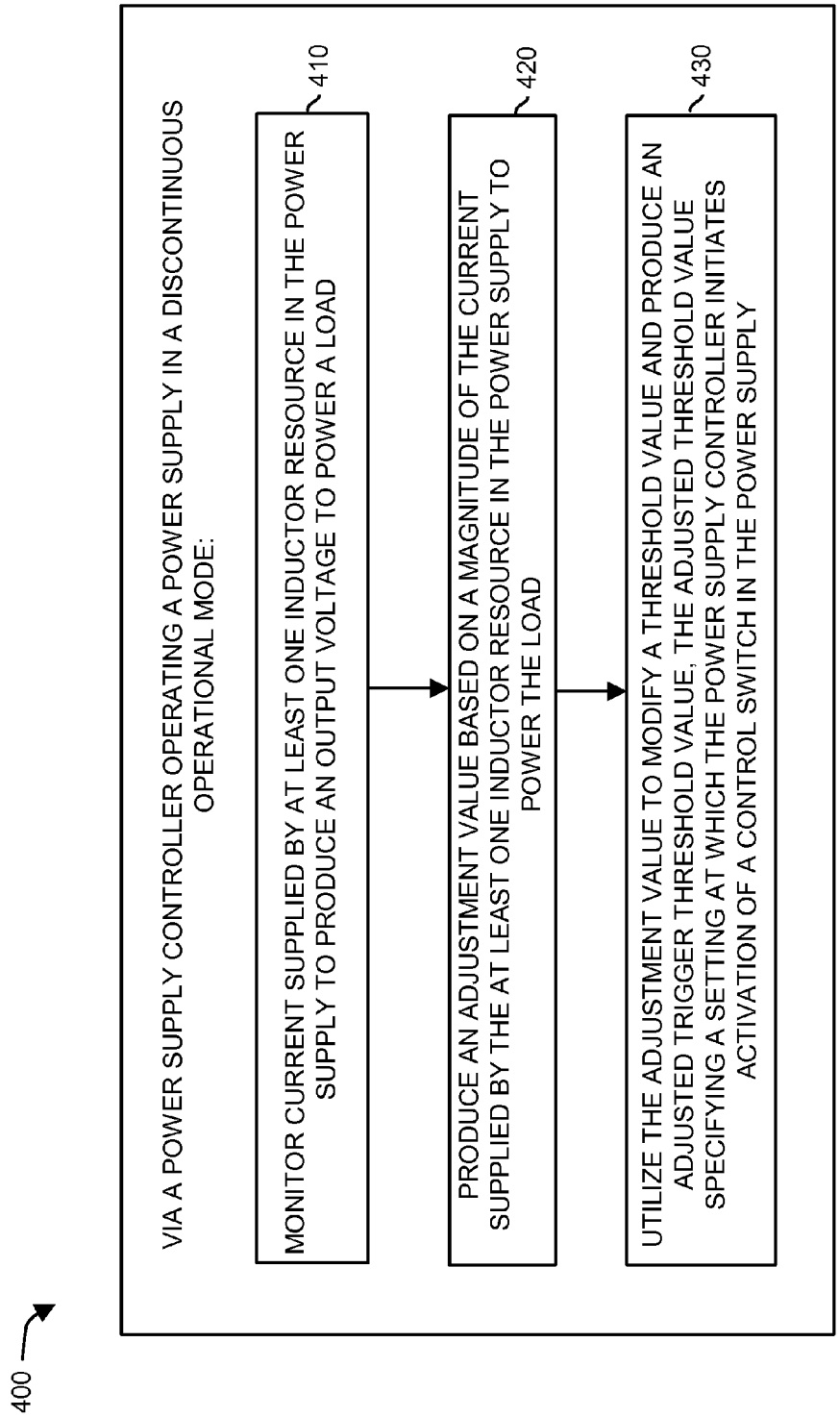
FIGS. 4-7 are flowcharts illustrating example methods according to embodiments herein.

FIG. 4 is a flowchart 400 illustrating an example method of controlling operation of a power supply 100 in a discontinuous mode according to embodiments herein. Note that there will be some overlap with respect to concepts as discussed above. Also, note that the steps in the flowcharts can be executed in any suitable order.

Embodiments herein include executing the following steps via a power supply controller 140 operating power supply 100 in a discontinuous operational mode.

In step 410, current monitor resource 210 of controller 140 monitors a total current supplied by at least one inductor resource 144 in the power supply 100 to produce an output voltage 190 to power a load 118.

In step 420, adjustment value generator 145 of controller 140 produces an adjustment value $V_{ADJ}$ based on a magnitude of the current $I_L$ supplied by the at least one inductor resource 144 in the power supply 100 to power the load 118.

In step 430, the controller 140 utilizes the adjustment value $V_{ADJ}$ produced by multiplier 250 to modify a threshold value, $V_{TH}$, and produce an adjusted trigger threshold value $V_{TH}$–$V_{ADJ}$ inputted to comparator 260. The adjusted threshold value (e.g., $V_{TH}$–$V_{ADJ}$) specifies a setting at which the power supply controller 140 initiates activation of control switch 150 in the power supply 100 such as at T4, T7, etc.

Figure 5:
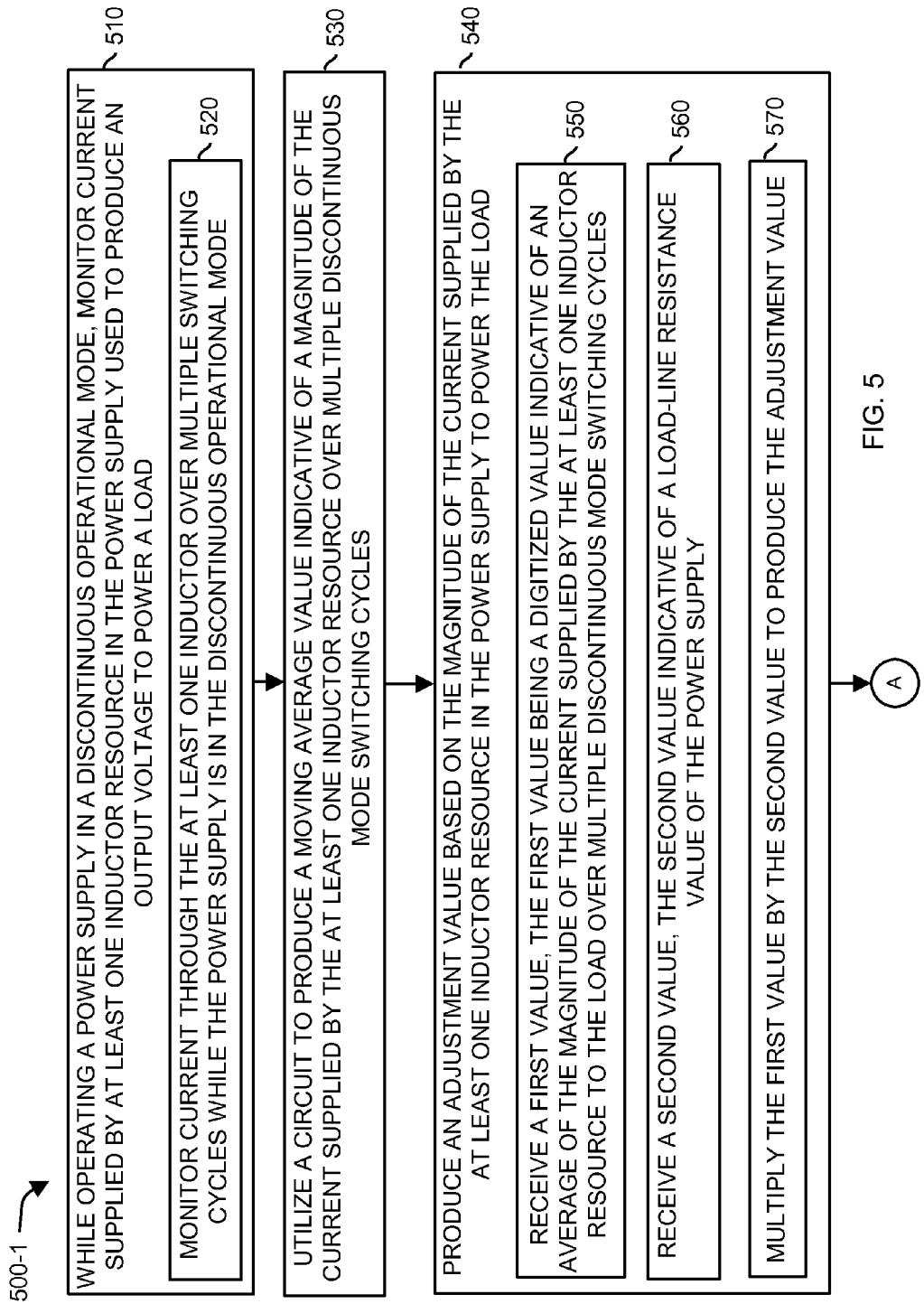
Figure 6:
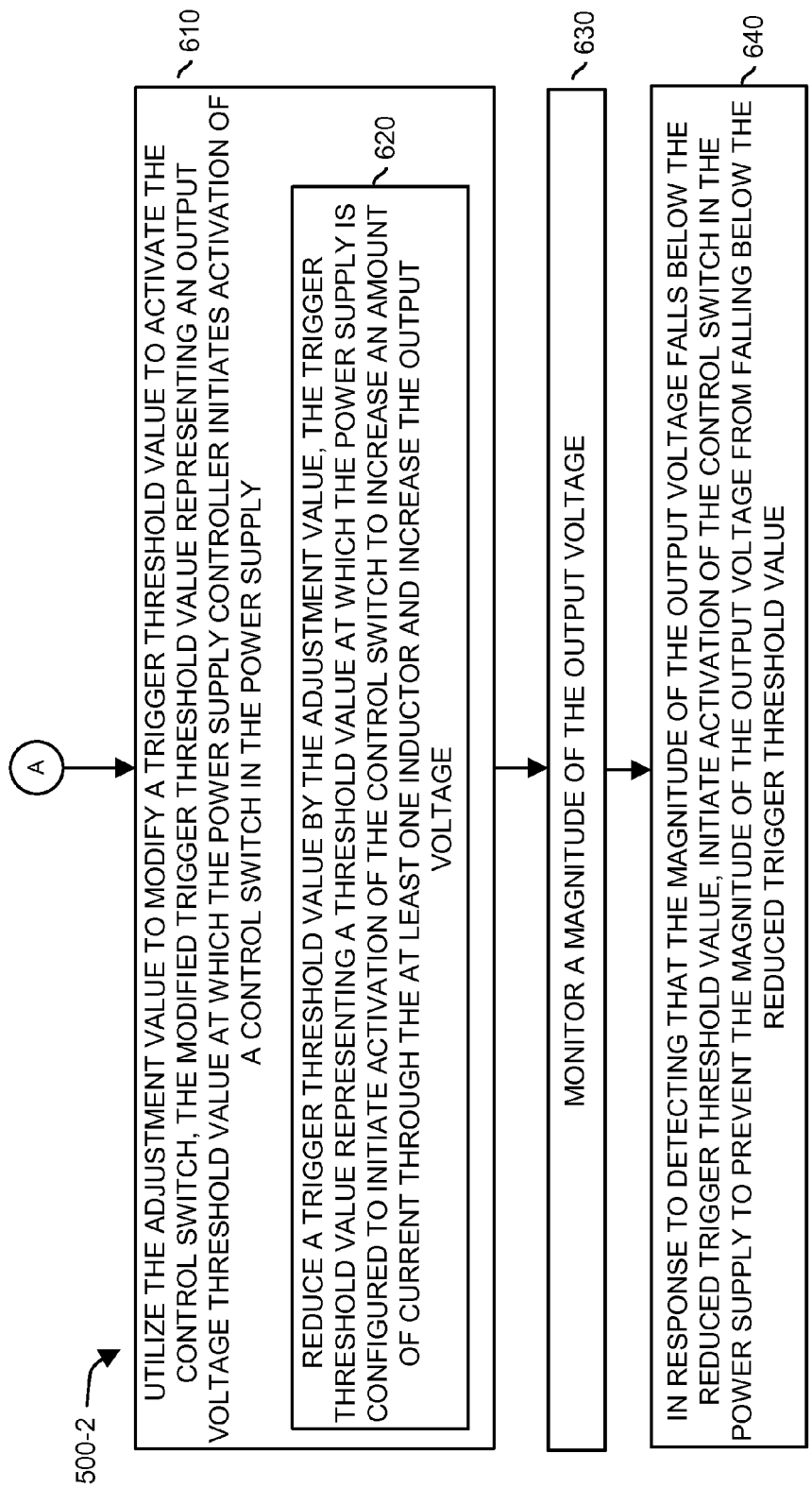

FIGS. 5 and 6 combine to form flowchart 500 (e.g., flowchart 500-1 and flowchart 500-2) illustrating a detailed example method of generating and adjustment value and utilizing the adjustment value $V_{ADJ}$ while operating the power supply 100 in a discontinuous mode according to embodiments herein. Note that there will be some overlap with respect to concepts as discussed above. The steps below can be executed in any suitable order.

In step 510 of flowchart 500-1, while operating the power supply 100 in a discontinuous operational mode, the controller 140 monitors current supplied by at least one inductor resource 144 in the power supply 100 used to produce an output voltage 190 to power a load 118.

In sub-step 520, the current monitor resource 210 of controller 140 monitors current through the at least one inductor 140 over multiple discontinuous mode switching cycles. As previously discussed, operation of switches between time T1 and T4 in FIG. 3 is one cycle; operation of between time T1 and T4 in FIG. 3 is one cycle; and so on. In one embodiment, the current monitor resource 210 produces an analog value to respective digital values inputted to filter circuit 220.

In step 530, the controller 140 utilizes a circuit such as filter circuit 220 to produce a moving average value $I_{L-AVE}$ indicative of a magnitude (e.g., average magnitude or moving average magnitude) of the current $I_L$ supplied by the at least one inductor resource 144 over multiple discontinuous mode switching cycles. The value $I_{L-AVERAGE}$ can be an average digital value representing an average amount of current through the inductor resources of power supply 100 used to power load 118.

In step 540, the controller 140 produces an adjustment value $V_{ADJ}$ based on the magnitude of the current (e.g., $I_{L-AVE}$) supplied by the at least one inductor resource 144 in the power supply 100 to power the load 118.

As an example, in sub-step 550, the multiplier 250 in controller 140 receives a first value (e.g., $I_{L-AVE}$) produced by filter circuit or averaging circuit. In one embodiment, the first value received by multiplier 250 is a digitized value indicative of an average of the magnitude of the current supplied by the at least one inductor resource 144 to the load 118 over multiple discontinuous mode switching cycles. In one embodiment, the $I_{L-AVERAGE}$ is a value representing an average of current during each of 3 or more discontinuous mode switching cycles.

In sub-step 560, the multiplier 250 of controller 140 receives a second value (i.e., $R_{LOAD\_LINE}$).

In one embodiment, the second value is configured value indicative of a load-line resistance value of the power supply 100.

In sub-step 570, the multiplier 250 of controller 140 multiplies the first value by the second value to produce the adjustment value, $V_{ADJ}$.

In step 610 of flowchart 600-2, the controller 140 utilizes the adjustment value $V_{ADJ}$ produced by multiplier 250 to modify a trigger threshold value $V_{TH}$ to activate the control switch 150. For example, via a circuit such as arithmetic function 255, the controller 140 produces an adjusted or modified threshold value $V_{TH}$–$V_{ADJ}$. The modified trigger threshold value (i.e., $V_{TH}$–$V_{ADJ}$) represents an output voltage threshold value at which the power supply controller 140 initiates activation of control switch 140 in the power supply 100 while in the discontinuous mode.

In sub-step 620, the comparator 260 of controller 140 reduces a trigger threshold value $V_{TH}$ by the adjustment value $V_{ADJ}$. As discussed above, the modified trigger threshold value (i.e., $V_{TH}$–$V_{ADJ}$) represents a threshold value at which the power supply 100 is configured to initiate activation of the control switch 150 to increase an amount of current through the at least one inductor 144 and increase the output voltage 190.

In step 630, the controller 140 monitors a magnitude of the output voltage 190. The comparator 260 compares a magnitude of the output voltage 190 of power supply 100 to the modified trigger threshold value (i.e., $V_{TH}$–$V_{ADJ}$).

In step 640, in response to detecting that the magnitude of the output voltage 190 falls below or is substantially equal to the reduced trigger threshold value at approximately time T4, in FIG. 3, the controller 140 initiates activation of the control switch 150 in the power supply 100 to prevent the magnitude of the output voltage 190 from falling below the reduced trigger threshold value (i.e., $V_{TH}$–$V_{ADJ}$). As shown in FIG. 3, the controller repeats activating the control switch at time T7, etc.

Figure 7:
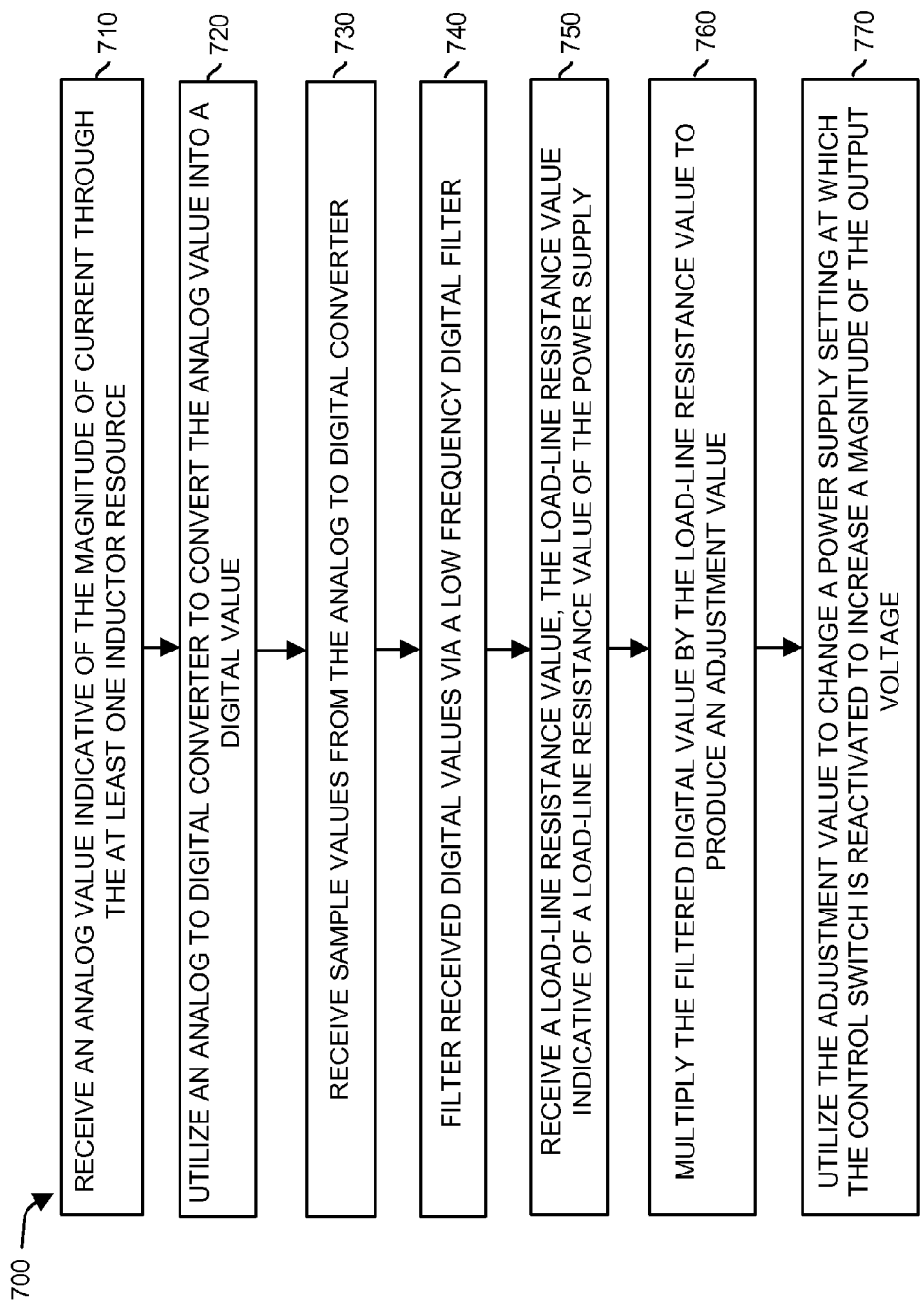

FIG. 7 is a flowchart 700 illustrating an example method of monitoring a magnitude of the output voltage and switchover from a discontinuous mode to a continuous operational mode according to embodiments herein. Note that there will be some overlap with respect to concepts as discussed above. The steps below can be executed in any suitable order.

In step 710, the current monitor resource 210 such as an analog to digital circuit in controller 140 receives an analog value or voltage signal indicative of the magnitude of the total current $I_L$ through the one or more inductor resources 144 of the power converter phases in power supply 100.

In step 720, the current monitor resource 210 or analog to digital converter converts the analog value of each phase into a digital value and outputs the digital value to filter circuit 220. The analog value representative of the current through the inductor resource can be generated in any suitable manner. In one embodiment, the current can be generated based on a voltage across the inductor resource.

In step 730, the filter circuit or averaging circuit of controller 140 receives sample values from the current monitor resource 210 (e.g., an analog to digital converter).

In step 740, the filter circuit 220 of controller 140 filters the received digital values from the current monitor resource 210. In one embodiment, the filter circuit 220 is a low frequency digital filter.

In step 750, the multiplier 250 of controller 140 retrieves a load-line resistance value from register 205-1. The load-line resistance value indicates a load-line resistance value setting of the power supply 100.

In step 760, the multiplier 250 of controller 140 multiplies the filtered digital value, $I_{L\text{-}AVE}$, by the load-line resistance value, $R_{LOAD\_LINE}$, to produce an adjustment value, $V_{ADJ}$.

In step 730, the controller 140 utilizes the adjustment value to change a power supply setting such as $V_{TH}$ at which the control switch 150 is reactivated (e.g., turned ON again) to increase a magnitude of the output voltage 190. Reducing a turn ON threshold of the control switch 150 to $V_{TH}\text{-}V_{ADJ}$ reduces the overall average magnitude of the output voltage 190 by $V_{ADJ}$.

Figure 8:
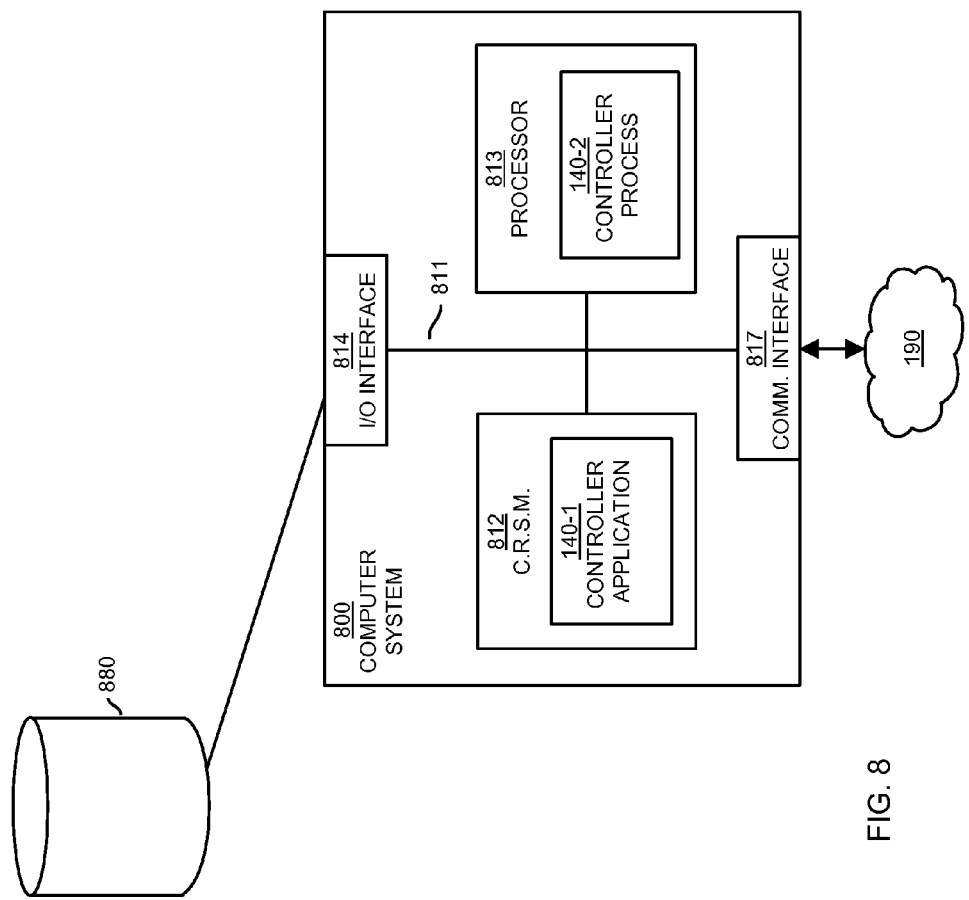
FIG. 8 is an example diagram illustrating a processor and encoded hardware storage medium according to embodiments herein.

FIG. 8 is an example block diagram of a controller 140 that provides computer processing according to embodiments herein.

Controller 140 can be or include a computerized device such as a processing device, processor, digital signal processor, etc.

Note that the following discussion provides a basic embodiment indicating how to carry out functionality associated with controller 140 as discussed herein. However, it should be noted that the actual configuration for carrying out the operations as described herein can vary depending on a respective application.

As shown, controller 140 of the present example includes an interconnect 811 that couples computer readable hardware storage media 812 such as a non-transitory type of media, computer readable, hardware storage medium, etc., in which digital information can be stored and retrieved. Controller 140 can further include a processor 813, I/O interface 814, and a communications interface 817.

I/O interface 814 provides connectivity to repository 880, and if present, display screen, peripheral devices such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with controller application 140-1. The instructions are executed by a respective resource such as controller 140 to perform any of the operations as discussed herein.

Communications interface 817 enables controller 140 to communicate over a resource such as network 190 to retrieve information from remote sources and communicate with other computers, switches, clients, servers, etc. I/O interface 814 also enables processor 813 to retrieve or attempt retrieval of stored information from repository 880.

As shown, computer readable storage media 812 can be encoded with controller application 140-1 executed by processor 813 as controller process 140-2.

During operation of one embodiment when the controller 140 operates in a discontinuous mode as discussed herein, the processor 813 accesses computer readable storage media 812 via the use of interconnect 811 in order to launch, run, execute, interpret or otherwise perform the instructions of controller application 140-1 stored in computer readable storage medium 812. Execution of the controller application 140-1 produces processing functionality in processor 813. In other words, the controller process 140-2 associated with processor 813 represents one or more aspects of executing controller application 140-1 within or upon the processor 813 in the controller 140.

Those skilled in the art will understand that the controller 140 can be a computer system and include other processes and/or software and hardware components, such as an operating system that controls allocation and use of hardware processing resources to execute controller application 140-1.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via a power supply controller operating a power supply in a discontinuous operational mode:
monitoring current supplied by an inductor resource in the power supply to produce an output voltage to power a load;
producing an adjustment value based on a magnitude of the current supplied by the inductor resource in the power supply to power the load; and
utilizing the adjustment value to modify a trigger threshold voltage value and produce an adjusted trigger threshold voltage value at which the power supply controller initiates activation of a control switch in the power supply, activation of the control switch increasing current through the inductor resource to power the load;
wherein monitoring the current supplied by the inductor resource includes:
detecting the current supplied by the inductor resource based on a first portion of current and a second portion of current passing through the inductor resource during each of multiple discontinuous mode switching cycles, the first portion of current flowing through the inductor resource based on activation of the control switch in the power supply, the second portion of current flowing through the inductor resource based on activation of a synchronous switch in the power supply.

2. The method as in claim 1, wherein the control switch and the synchronous switch in the power supply control the magnitude of current through the inductor resource to the load, the method further comprising:
monitoring a magnitude of the output voltage; and
in response to detecting that the magnitude of the output voltage falls below the adjusted trigger threshold voltage value, initiating activation of the control switch in the power supply to increase an amount of current through the inductor resource and increase a magnitude of the output voltage to a value above the adjusted trigger threshold voltage value.

3. The method as in claim 1 further comprising:
monitoring a magnitude of the output voltage; and
initiating activation of the control switch in the power supply to prevent the magnitude of the output voltage from falling substantially below the adjusted trigger threshold voltage value.

4. The method as in claim 1, wherein monitoring the current supplied by the inductor resource includes monitoring current through the inductor resource over the multiple discontinuous mode switching cycles while the power supply is in the discontinuous operational mode; and
wherein producing the adjustment value comprises generating a value indicative of an average amount of current supplied through the inductor resource to the load over the multiple switching cycles.

5. The method as in claim 1 further comprising:
utilizing a low-pass filter to produce a moving average value indicative of the magnitude of the current supplied by the inductor resource over multiple switching cycles.

6. The method as in claim 1, wherein monitoring the current supplied by the inductor resource includes:
receiving an analog value indicative of the magnitude of current through the inductor resource;
converting the analog value into a digital value using an analog to digital converter;
filtering the digital value via a low frequency digital filter;
receiving a load-line resistance value, the load-line resistance value indicative of a load-line resistance value of the power supply; and
multiplying the filtered digital value by the load-line resistance value to produce the adjustment value.

7. The method as in claim 6 further comprising:
receiving a voltage setpoint value in which to regulate a magnitude of the output voltage of the power supply;
receiving a programmed error voltage value indicative of an acceptable error with respect to the voltage setpoint value; and
setting the adjusted trigger threshold voltage value, in which the controller initiates activation of a control switch in the power supply during the discontinuous operational mode, to be equal to:
setpoint value−programmed error voltage value−adjustment value.

8. The method as in claim 1, wherein the power supply controller controls the control switch and the synchronous switch in the power supply to control the magnitude of current through the inductor resource to the load, the method further comprising:
in a first portion of a discontinuous mode switching cycle:
controlling the control switch to an ON state,
controlling the synchronous switch to an OFF state;
in a second portion of the discontinuous mode switching cycle:
controlling the control switch to an OFF state,
controlling the synchronous switch to an ON state;
in a third portion of the discontinuous mode switching cycle,
in which the magnitude of the current supplied by the inductor resource to the load is substantially zero:
controlling the control switch to an OFF state,
controlling the synchronous switch to an OFF state.

9. The method as in claim 8 further comprising:
monitoring a magnitude of the output voltage in the third portion of the discontinuous mode switching cycle; and
in response to detecting that the magnitude of the output voltage during the third portion of the discontinuous mode switching cycle falls below the adjusted trigger threshold voltage value, initiating activation of the control switch in the power supply to increase an amount of current through the inductor resource, the increased amount of current increasing the magnitude of the output voltage above the adjusted trigger threshold voltage value.

10. A method comprising:
via a power supply controller operating a power supply in a discontinuous operational mode:
monitoring current supplied by an inductor resource in the power supply to produce an output voltage to power a load;
producing an adjustment value based on a magnitude of the current supplied by the inductor resource in the power supply to power the load; and
utilizing the adjustment value to modify a trigger threshold voltage value and produce an adjusted trigger threshold voltage value at which the power supply controller initiates activation of a control switch in the power supply, activation of the control switch increasing current through the inductor resource to power the load;
wherein producing the adjustment value includes:
receiving a first value, the first value indicative of an average of the magnitude of the current supplied by the inductor resource to the load over multiple discontinuous mode switching cycles;
receiving a second value, the second value indicative of a load-line resistance value of the power supply; and
multiplying the first value by the second value to produce the adjustment value.

11. The method as in claim 10 further comprising:
reducing the trigger threshold voltage value by the adjustment value, the adjusted trigger threshold voltage value representing a threshold value at which the power supply is configured to, in response to detecting that the magnitude of the output voltage is below the adjusted trigger threshold voltage value, initiate activation of the control switch to increase an amount of current through the inductor resource and increase the output voltage.

12. A method comprising:
via a power supply controller in a power supply:
monitoring current supplied by an inductor resource in the power supply to power a load while the power supply operates in a discontinuous operational mode in which both a control switch and a synchronous switch coupled to the inductor resource are deactivated during a portion of a control cycle in which an output voltage produced by the inductor resource is above a threshold value and an output capacitance of the power supply provides current to the load;
producing an error voltage adjustment value based on a magnitude of the current supplied by the inductor resource in the power supply to power the load;
adjusting an error voltage of the power supply by the error voltage adjustment value; and
utilizing the adjusted error voltage to control the output voltage of the power supply to power the load;
wherein producing the error voltage adjustment value includes:
receiving a first value, the first value indicative of the magnitude of the current supplied by the inductor resource to the load;
receiving a second value, the second value indicative of a load-line resistance value of the power supply; and
multiplying the first value by the second value to produce the error voltage adjustment value.

13. The method as in claim 12 further comprising:
producing the error voltage based at least in part on a difference between a magnitude of the output voltage and a desired setting of the output voltage; and
wherein adjusting the error voltage of the power supply includes:
adding the error voltage adjustment value to the error voltage to produce the adjusted error voltage.

14. A power supply system comprising:
a control switch;
a synchronous switch;
an inductor resource, the synchronous switch and the control switch controlling current through the inductor resource;
a controller including:
a current monitor resource to monitor current supplied by the inductor resource to produce an output voltage to power a load;
an adjustment value generator circuit configured to produce an adjustment value based on a magnitude of the current supplied to the load by the inductor resource while the power supply system is in a discontinuous mode; and
wherein the controller is configured to utilize the adjustment value to modify an output voltage trigger value, the output voltage trigger value representing an output voltage threshold at which the power supply controller initiates activation of the control switch in the power supply system to increase an amount of current supplied to the load through the inductor resource;
wherein the adjustment value generator circuit is configured to:
receive a first value, the first value indicative of an average of the magnitude of the current supplied by the inductor resource to the load over multiple discontinuous mode switching cycles;
receive a second value, the second value indicative of a load-line resistance value of the power supply; and
multiply the first value by the second value to produce the adjustment value, the power supply further comprising:
an arithmetic circuit configured to reduce the trigger threshold value by the adjustment value, the trigger threshold value representing a threshold value at which the controller is configured to initiate activation of the control switch to increase an amount of current through the inductor resource and increase the output voltage.

15. The power supply system as in claim 14, wherein the controller is configured to:
monitor a magnitude of the output voltage during a portion of a discontinuous mode switching cycle in which both the control switch and the synchronous switch are deactivated and in which substantially no current flows through the inductor resource to the load; and
in response to detecting that the magnitude of the output voltage falls below the adjusted trigger threshold value during the portion of the discontinuous mode switching cycle, initiate activation of the control switch in the power supply to increase an amount of current through the inductor resource and increase a magnitude of the output voltage.

16. The power supply system as in claim 14, wherein the controller is configured to:
monitor a magnitude of the output voltage; and
initiate activation of the control switch in the power supply to prevent the magnitude of the output voltage from falling substantially below the adjusted trigger threshold value.

17. The power supply system as in claim 14, wherein the controller is configured to:
monitor current through the inductor resource over the multiple discontinuous mode switching cycles while the power supply is operating in the discontinuous operational mode; and
generate the first value.

18. The power supply system as in claim 14, wherein the current monitor resource is configured to detect the current supplied by the inductor resource based on a first portion of current and a second portion of current passing through the inductor resource during each of the multiple discontinuous mode switching cycles, the first portion of current flowing through the inductor resource during a first respective portion of the discontinuous mode switching cycles in which the controller initiates activation of the control switch, the second portion of current flowing through the inductor resource during a second respective portion of the discontinuous mode switching cycles in which the controller initiates activation of the synchronous switch.

19. The power supply system as in claim 18, wherein the controller compares the output voltage to the output voltage trigger value during a third respective portion of the discontinuous mode switching cycles in which the controller initiates activation of the control switch in response to detecting that a magnitude of the output voltage is less than the modified output voltage trigger value.

* * * * *